June 16, 1964 E. H. W. ALLEN 3,137,167
LIQUID FLOW METER

Filed May 22, 1961 3 Sheets-Sheet 1

Inventor
Eric Harold William Allen
By Baldwin & Wight
Attorneys

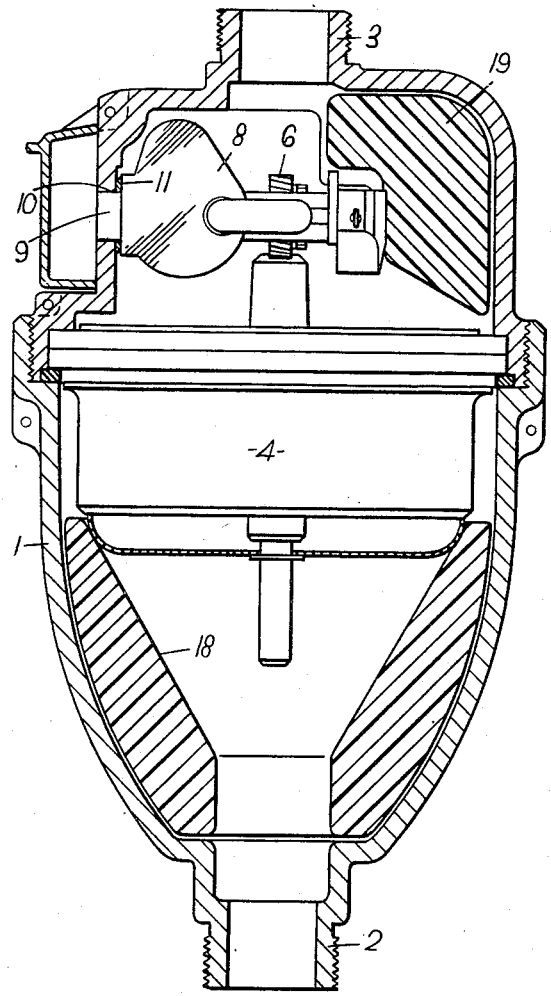

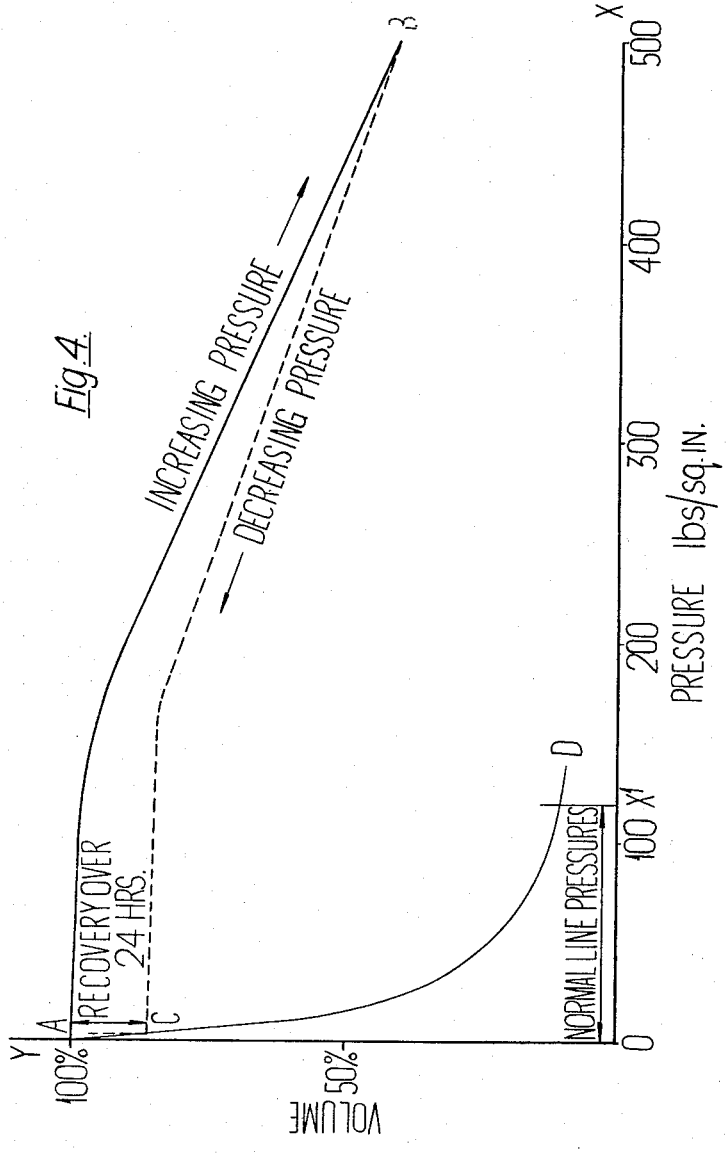

3,137,167
LIQUID FLOW METER
Eric Harold William Allen, Stopsley, Luton, England, assignor to George Kent Limited
Filed May 22, 1961, Ser. No. 111,637
12 Claims. (Cl. 73—277)

This invention relates to liquid flow meters.

The object of the invention is to provide a meter of which not only are the indicating parts protected against the deposit of dirt, the action of the liquid being measured and malicious or accidental damage by impact, but which is also protected as a whole against damage from the freezing of the liquid when the meter is used in conditions where the temperature can fall to freezing point.

According to the present invention, the indicating parts, which are necessarily exposed to inspection, are enclosed within a housing which is formed of a transparent material and which is attached to the casing of the meter about an inspection opening in the wall of the casing, so as to seal that opening and, within the liquid containing parts of the casing are contained one or more compressible elements formed of expanded rigid plastic, the compressibility of which enables the expansion of the liquid on being converted into ice to be absorbed so as to relieve the rigid parts of the meter from mechanical damage.

A meter, in accordance with the present invention, thus has the advantage of being protected against just those damaging effects, which are the most frequent causes of breakdown in service and which are responsible for much of the maintenance charges arising in meter installations.

The housing which contains the indicating parts provides a complete unit which can be removed and replaced as required and, conveniently, the casing can be charged with a transparent liquid operating as a lubricant for the indicator parts. The frost protection elements can be formed to be fitted into any convenient pocket in the meter casing.

The material selected to form the compressible frost protection elements has charactertistics which especially adapt the material to be contracted (and so relieve the parts from mechanical strain) not under the liquid pressures which normally apply, but mainly when subjected to excessive pressures such as would arise at the time of the conversion of the liquid into ice. This, therefore, enables protection to be afforded by elements which have relatively small bulk, and hence do not seriously reduce the effective cross-sectional area of liquid flow spaces in which the elements are contained; this is so, for the compressibility of the material is reserved for action during ice formation, for which purpose alone the elements are fitted to the meter.

The material selected to give protection against damage, due to the formation of ice, involved considerable research to discover a material having the special qualities required for the purpose: in the class of expanded rigid plastics which was finally discovered to have the properties, two particular materials are at present known to be successful: these are known as expanded rigid polystyrene and expanded rigid poly-vinyl-chloride (PVC): it is essential for the purpose of the invention that the cells of the structure of the mass shall be non-communicating and a density which has been found efficient for most practical applications is of the order of 12 lbs. per cubic foot.

Two forms of meter constructed in accordance with the present invention are shown in FIGURES 1–3 of the accompanying drawings. In the drawings:

FIGURE 3 is a vertical sectional elevation of a modified form of meter.

FIGURE 4 is a diagram showing the characteristics of the plastic protecting material according to the present invention.

Figure 1:
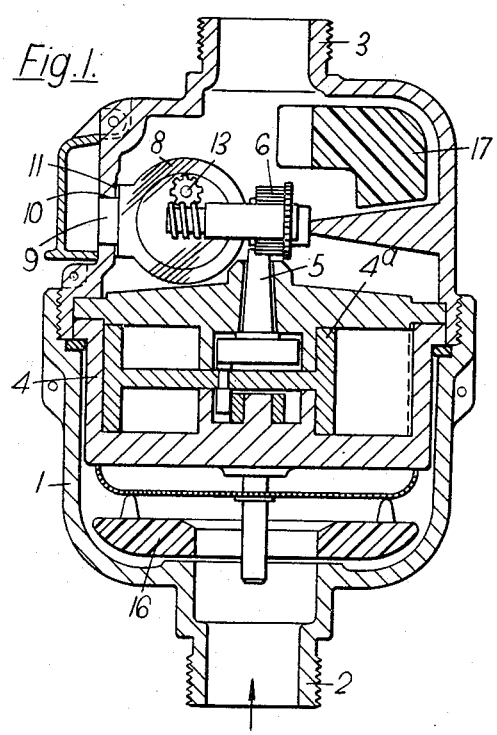
FIGURE 1 is a sectional elevation of one form of meter, in accordance with the invention.
Figure 2:
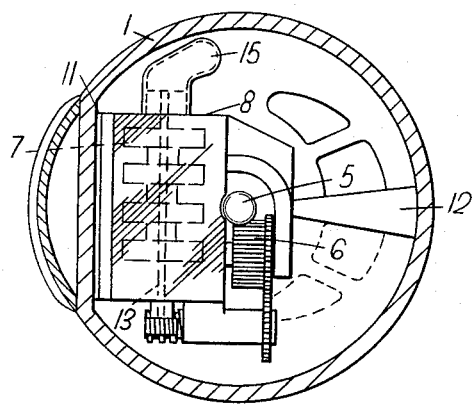
FIGURE 2 is a part-sectional plan view thereof.

Referring, firstly, to FIGURES 1 and 2, the meter comprises a housing 1 having supply and discharge connections 2, 3 and between those connections a measuring unit 4, comprising in the case selected, a gyratory piston 4a the movement of which is imparted in the well known manner to an output spindle 5, which rotates at a speed proportional to the flow of liquid: the motion is transmitted via gearing 6 to an indicator unit comprising indicator drums 7.

The drums 7 of the counter are enclosed in a casing 8, which with the enclosed drums provides a self-contained, sealing unit: the casing 8 is formed of, or at least contains, a panel of transparent material shaped to provide about the transparent material a projection 9 which enters snugly an inspection opening 10, which is formed in the wall of the meter housing 1, a sealing washer 11 being disposed between the unit and the housing.

Thus, although the casing of the indicator unit 8 extends into the flow space of the housing 1 its parts within the casing are sealed from the liquid being handled: the indicating drums 7 can be seen through the transparent material but, at the same time, those drums are protected against the deposit of dust and dirt on them and against damage by malicious or accidental impact. The casing 8 is pressed firmly against the sealing washer 11 by a support 12 on the housing 1.

The location of the drums 7 in the sealed casing 8 enables that casing to be charged with a liquid of transparent or near-transparent kind: indeed, such liquid can be a transparent or near-transparent lubricating liquid. In order to enable drive to be taken into the casing 8 without breaking its closure, the drive to the drums is effected by a spindle 13 which passes through an opening in the casing 8 which opening is sealed by an O-ring type of seal.

Pressure equilibrium between the liquid in the casing 8 and the liquid flowing through the meter housing 1 is created through a flexible sac 15 which is exposed to the pressure of the liquid flow in the housing and reacts on the static liquid in the casing 8, so as in this way to eliminate leakage via the sealing ring.

As so far described, the meter is protected against damage or spoilation which is commonly experienced: in order to extend the protection to another common form of damage, due to the freezing of the liquid flowing through the meter when the meter is used in conditions where low temperatures occur, the liquid containing spaces of the meter are fitted with pieces, e.g. blocks of compressible material of the class already referred to, i.e., the rigid expanded plastic kind.

The blocks can be disposed as found most convenient, and such blocks are indicated at 16, 17 in FIGURE 1.

In FIGURE 3 is shown a meter of a slightly different form from that shown in FIGURE 1, but which has the features of the sealed counter casing 8 and blocks of the compressible material referred to, these blocks being indicated at 18, 19 in FIGURE 3.

It is intended now to deal with the characteristics of the material which is used for the compressible blocks: reference is made to the diagram FIGURE 4, this diagram showing the action of the plastic material as compared to the action of expanded rubber which has been proposed for the same purpose with, however, no success.

The curves are plotted against the OX–OY axes, representing, respectively, the applied pressure and the resulting volume of a block of material: the curve A, B, C shows the behaviour of an expanded rigid plastic according to the invention, the curve A, D shows the behaviour of an expanded rubber, the diagram thus enabling the attributes of the material according to the invention to be the more easily appreciated.

The tests from which the diagram was prepared involved the subjection of the material to a pressure of up to 500 lbs. per square inch, which can be taken to represent the pressure which could arise when the material is subject to the formation of ice and, therefore, much in excess of the normal working pressure, which can fairly be taken as extending up to 120 lbs. per square inch, as indicated by the co-ordinate OX'.

As will be clear, within the normal working range OX', the expanded rigid plastic has only a very small reduction in volume with increase in applied pressure, the behaviour being indicated by the curve A–B: at pressures in excess of that range the rate of reduction in volume is, at first, relatively low and even at 200 lbs. per square inch, when the reduction rate begins to increase significantly, the rate of decrease in volume is lower than the rate of increase in pressure. The curve A–B demonstrates the suitability of the expanded rigid plastic, for it is clear that, as in the normal pressure range, there is substantially no reduction in volume so that the compressible function of the material is reserved for the higher pressures which will arise in the condition of freezing.

Considering now the curve A–D of expanded rubber, the rubber is compressed nearly to its limit of compressibility under only normal working pressures: it follows, of course, that the residual compressibility is small for operation in the range of the higher pressures which will arise under conditions of freezing and for which the material is specifically provided.

The diagram was prepared from the tests which measured the recovery of the materials over a period of 24 hours: as the curve B–C shows, the recovery of the expanded plastic is nearing the completion and such lack of recovery as is displayed is probably due to the initial take-up of compressiblity which would arise with any new piece of material and is, therefore, easily compensated for in determining the pristine volume.

The class of material according to the invention can easily be manufactured to any desired shape, adapting it for fitting as and where required in the apparatus to be protected.

It will now be clear that, by this invention, a meter is provided which is amply protected against the most common kinds of damage or spoilation, so that the meter will be more reliable in use and will be less expensive to maintain even when used in severe atmospheric conditions.

I claim:

1. A liquid flow meter comprising a meter housing formed with an inspection opening, a sealed casing unit having a transparent inspection panel, a flow indicator disposed within the sealed casing unit, means applying and sealing the sealed casing unit to the meter housing with said inspection panel registering with said inspection opening whereby the flow indicator is visible through the inspection panel and the inspection opening, and a piece of compressible material formed of an expanded rigid plastic disposed within the housing.

2. A flow meter, as claimed in claim 1, and wherein the sealed casing is charged with liquid.

3. A liquid flow meter as claimed in claim 1, wherein said means comprises a sealing ring disposed about the inspection opening in the meter housing and a shoulder formed on the sealed casing unit and abutting said sealing ring to form a sealed connection between said casing unit and said meter housing.

4. A liquid flow meter comprising a meter housing formed with an inspection opening, a sealed casing unit within the meter housing and formed with an opening adapted to receive a spindle, a flow indicator disposed within the sealed casing unit and having a spindle extending through the opening in the sealed casing unit in sealed relation thereto, an inspection panel of transparent material in the sealed casing unit, means applying and sealing the casing unit to the inspection opening in the meter housing whereby the flow indicator is visible through the inspection panel and the inspection opening, and a piece of compressible material formed of an expanded rigid plastic disposed within the housing and adapted to compress within the limit of its recovery to absorb internal pressures.

5. A liquid flow meter as claimed in claim 4, wherein said sealed casing is charged with a fluid, and wherein said casing is fitted with a flexible sac having an inside and an outside, one of said sides being exposed to the fluid in said casing and the other of said sides being exposed to fluid in said housing, whereby pressure equilibrium between the interiors of said casing and said housing is established.

6. A liquid flow meter as claimed in claim 4, wherein said means comprises a sealing ring disposed about the inspection opening in the meter housing and a shoulder formed on the sealed casing unit and abutting said sealing ring to form a sealed connection between said sealed casing unit and said meter housing.

7. A liquid flow meter as claimed in claim 4, wherein the flow meter is of the gyratory piston type and comprises a gyratory piston means and means to transmit the output from the gyratory piston means to the spindle and the indicator in the sealed casing.

8. A liquid flow meter as claimed in claim 4, wherein the compressible material is expanded rigid polystyrene, the cells of which are non-communicating.

9. A liquid flow meter as claimed in claim 4, wherein the compressible material is expanded rigid poly-vinyl-chloride, the cells of which are non-communicating.

10. A liquid flow measuring meter comprising a housing having a liquid inlet and a liquid outlet and having within it a mechanism which is displaceable by the flow and wherein the housing has within it a protective compressible element formed of an expanded rigid plastic of such volume that it will compress within the limit of its recovery by the conversion of the liquid into ice, said expanded rigid plastic material having the property of retaining its volume substantially unchanged over the normal range of operating fluid metering pressures existing in said housing but being compressible to substantially reduce volume when subjected to pressures in a higher range of pressures caused by conversion of the liquid into ice within said housing, said property of said expanded rigid plastic material being substantially that of material of the group comprising expanded rigid polystyrene and expanded rigid poly-vinyl-chloride.

11. A liquid flow measuring meter as claimed in claim 10 wherein the expanded rigid plastic is expanded rigid polystyrene.

12. A liquid flow measuring meter as claimed in claim 10 wherein the expanded rigid plastic is expanded poly-vinyl-chloride.

References Cited in the file of this patent

UNITED STATES PATENTS

| | | |
|---|---|---|
| 1,477,748 | Bissell | Dec. 18, 1923 |
| 1,495,010 | Ford | May 20, 1924 |
| 1,718,803 | Van Gilder | June 25, 1929 |
| 1,971,026 | Beall | Aug. 21, 1934 |
| 2,738,672 | Smith et al. | Mar. 20, 1956 |
| 2,972,886 | Hanks | Feb. 28, 1961 |
| 2,989,867 | Treff et al. | June 27, 1961 |